April 29, 1958  R. B. TASKER ET AL  2,832,953
SWEEP LIMITER
Filed April 23, 1951  6 Sheets-Sheet 1

INVENTORS
RAYMOND B. TASKER,
BURTON CUTLER
BY
ATT'YS

April 29, 1958 R. B. TASKER ET AL 2,832,953
SWEEP LIMITER
Filed April 23, 1951 6 Sheets-Sheet 2

INVENTORS
RAYMOND B. TASKER,
BURTON CUTLER
BY
ATT'YS

United States Patent Office 2,832,953
Patented Apr. 29, 1958

2,832,953

SWEEP LIMITER

Raymond B. Tasker, Sepulveda, and Burton Cutler, Los Angeles, Calif., assignors to Gilfillan Bros., Inc., Los Angeles, Calif., a corporation of California Application April 23, 1951, Serial No. 222,512

18 Claims. (Cl. 343—11)

The present invention relates to improved indicating means in radar systems of, for example, but not necessarily limited to, those used in ground controlled approach (G. C. A.) aircraft landing systems, and more specifically relates to improved means and techniques whereby the displays produced by the indicating means may be more effectively clipped, limited or tailored so as to achieve more efficient use of the viewing screen of the cathode ray tube which serves to visually present both the azimuth versus range and elevation versus range displays, all on the same cathode ray tube on a time sharing basis.

A general object of the present invention is to provide an improved means and techniques for limiting predetermined cathode beam sweeps at predetermined times for obtaining the above indicated results.

A specific object of the present invention is to provide improved sweep limiting means of this character using analogue computer principles described generally herein for producing predetermined glide path and runway course lines and applied herein specifically to produce cathode beam sweep limiting.

Another general object of the present invention is to provide an improved sweep limiting circuit for use in shaping and/or clipping the pattern on a cathode ray tube display, and in particular to shaping and/or clipping the two separate and distinct two-dimensional representations employed heretofore in ground controlled approach (G. C. A.) radar equipment.

Figures 1, 5A, 7, 8:
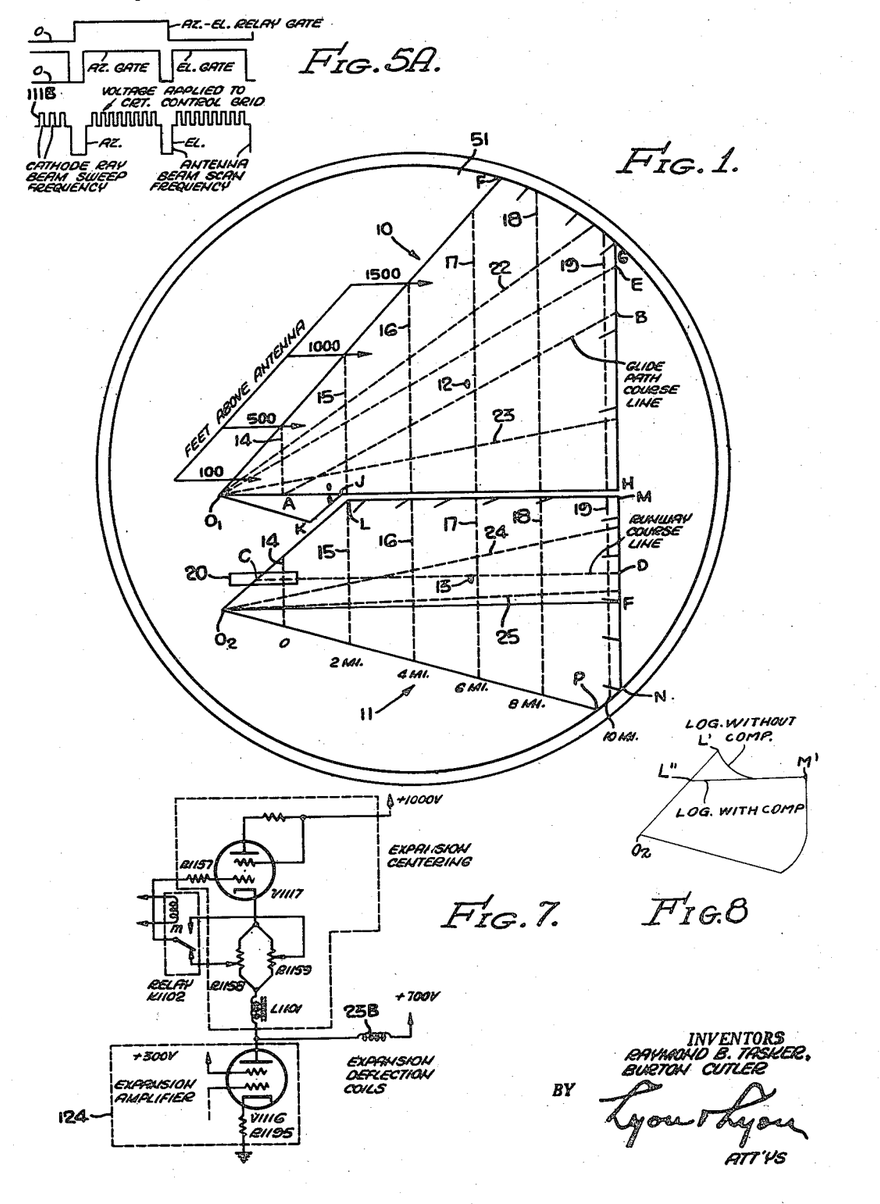
Figure 1 shows two displays produced on the viewing face of the cathode ray tube in accordance with features of the present invention.
Figure 5A is a schematic representation for purposes of illustrating the time scans of the elevation blanking gate, the azimuth blanking gate and the Az.-El. relay gate.
Figure 7 is a schematic circuit diagram illustrating a circuit for establishing the electrical center of the cathode ray tube display.
Figure 8 serves to indicate the flexible control provided by this invention.

In systems of this type it is desired to provide flexible, compact, light and inexpensive equipment for purposes of shaping and clipping the multiple pattern display from which an observer may accurately locate the position of an aircraft in space and with respect to a predetermined approach glide path and fixed obstacles. This information is readily ascertained in that the two distinct representations, i. e., one showing the position of the aircraft as a function of its elevation and range, and the other showing the position of the aircraft as a function of its azimuth and range, are correlated in that one of the representations lies directly above the other, with the range in each pattern being on the same scale and represented by the same horizontal distance in each pattern, as indicated in Figure 1.

Another object of the present invention is to provide an improved system of this character in which the blanking or clipping, as it appears on the cathode ray tube, is cleaner and sharper and approaches the idealized condition.

Another object of the present invention is to provide an improved sweep limiter characterized by its flexibility whereby the cathode ray tube representations may be adjusted, altered or tailored readily and easily to develop displays either with cathode beam sweeps varying linearly with time or varying logarithmically with time.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 2A, 2B and 2C show, in schematic form, portions of the apparatus used in producing the display shown in Figure 1, it being noted that the terminals which are to be connected in these Figures 2A, 2B and 2C are represented by the same notations, and when thus connected Figures 2A, 2B and 2C comprise Figure 2;

Figure 4 is helpful in describing the cyclical operation of the antenna scanning mechanism and associated equipment shown in Figure 2A;

Figure 5 shows, in graphical form, the voltage variations derived in accordance with scanning movement of the azimuth and elevation antennas shown in Figure 2A as a function of the angular position of the corresponding radiated antenna beam, the portions of these curves shown in full lines being referred to herein as antenna beam angle voltage, and are used in effecting important control operations in accordance with features of the present invention;

In general, the apparatus described herein serves to produce the elevation display 10 (Figure 1) and azimuth display 11 with the predetermined safe glide path represented by the line AB in the elevation display 10, produced electronically as a series of dashes, and to correspondingly produce electronically the runway line in the azimuth display 11 represented by the line CD. This is for the general purpose of allowing an observer to "track" the course of an aircraft appearing as the dots 12, 13 on the elevation and azimuth displays, respectively, with reference to such corresponding lines AB and CD.

It is noted that these displays 10, 11 are produced by radial cathode ray beam sweeps originating from the adjusted electrical centers $O_1$, $O_2$ of the cathode beam deflecting system. The series of vertically aligned lines 14, 15, 16, 17, 18 and 19 in both displays 10, 11 represent range lines, i. e., the locus of points of constant distance from the centers $O_1$ and $O_2$, as the case may be. The range line 14 passes through the aircraft touchdown point A on the elevation display, and of course through the small rectangular tab 20 which may be placed on the face of the cathode ray tube to indicate the position of the aircraft landing strip. The line 14 in displays 10 and 11 thus represents zero distance from touchdown. The lines 15, 16, 17, 18 and 19 represent, respectively, distances two miles, four miles, six miles, eight miles and ten miles from the corresponding touchdown point in the azimuth and elevation displays 11, 10.

It will be observed that the elevation display 10 and azimuth display 11 are irregular in shape, and such irregularities in the displays are produced by pattern limiting or clipping so as to allow more efficient use of the viewing surface of the tube and to alow the most important portions of the displays 10, 11 to lie closer to each other. For purposes of reference, the elevation display comprises the area defined by $O_1$, F, G, H, J, K, $O_1$. Similarly, for purposes of reference, the azimuth display 11 is confined in the area defined by $O_2$, L, M, N, P, $O_2$. The pair of radially extending lines 22, 23 in the elevation display are well known so-called V-follower lines, produced in accordance with conventional means, and serve to indicate the area scanned by the azimuth antenna. Similarly, the pair of radially extending V-follower lines 24 and 25 in the azimuth display 11 indicates the area scanned by the elevation antenna.

As indicated above, the present invention concerns itself particularly with pattern limiting or clipping. However, before entering into a detailed discussion of the apparatus and method used in producing such lines AB and CD, the apparatus for producing the displays 10 and 11 is first described in connection with Figures 2A, 2B and 2C which, when interconnected as indicated thereon, serves as Figure 2.

Pattern producing means

Figures 2A, 4, 5:
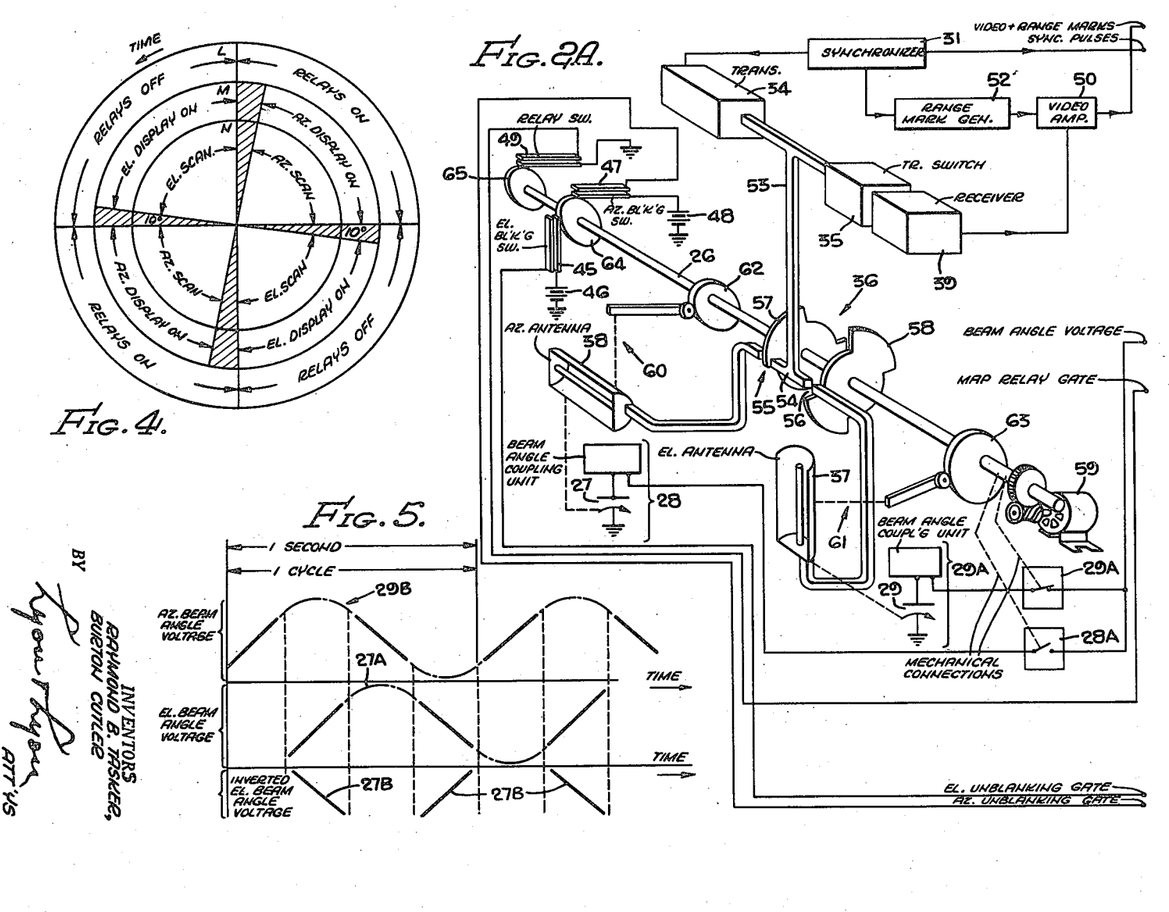

In Figure 2A the synchronizer 31 serves to generate timing pulses which are used to time the operation of pulses applied to the transmitter 34 to initiate its operation. The transmitter stage 34, pulsed at a constant repetition rate of, for example, 2,000 pulses per second, consists of, for example, a magnetron oscillator with a characteristic frequency of about 10,000 megacycles. The output of this transmitter stage 34 is transferred to either the elevation (El.) antenna 37 or azimuth (Az.) antenna 38, depending upon the position of the motor driven interrupter or radio frequency switch 36. The transmit-receive (T–R) switch 35 prevents power from the transmitter 34 from being applied directly to the receiver 39. This transmit-receive switch 35, as is well known in the art, allows low intensity signals such as a train of resulting echo signals received on the antennas 37, 38 to be transferred to the input terminals of the receiver 39.

This diversion of energy from the transmitter 34 to the antennas 37, 38, accomplished by operation of switch 36, occurs at a rate of approximately 2 per second, so that in effect the combined antennas obtain 4 "looks" per second of the space scanned. The resulting antenna beams are caused to move angularly, i. e., to scan upon rotation of the shaft 26. The switch 36 is rotated twice per second, and while energy is being transmitted to one of the antennas 37, 38, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, for "Bridge Type Precision Antenna Structure" now Patent Number 2,596,113 issued May 13, 1952 which depends for its operation on the use of a variable wave guide type of antenna. This particular means, per se, forms no part of the present invention, and, so far as the aspects of the present invention are concerned, the antenna scanning beam may be produced by moving the entire antenna through a relatively small arc of a circle. Actually, in fact, the azimuth antenna beam may scan first in one direction and then in the other, waiting after each scan while the elevation beam completes a scan in elevation.

While in any position during the part of the cycle in which the R. F. switch 36 allows the flow of energy to the elevation antenna 37, the elevation antenna beam is electrically scanned in elevation. The angular position of the elevation antenna beam is measured by means of a variable capacitor 27, one plate of which is attached to the beam scanner of elevation antenna 37 and varied in accordance therewith, such capacitor 27 comprising one part of a capacitative potentiometer contained in the angle coupling unit 28, which may be of the type described and claimed in the copending patent application of George B. Crane, Serial No. 212,114, filed February 21, 1951, now Patent Number 2,650,358. The angle coupling unit 28 thus used with angle capacitor 27 is useful in developing the elevation beam angle voltage represented as 27A in Figure 5. Similarly, the angle in azimuth of the azimuth antenna beam is measured by the angle capacitor 29 in azimuth angle coupling unit 29A, operating synchronously with the scanner of the azimuth antenna 37. Such variation in azimuth angle voltage as a function of the particular angular position of the antenna beam is represented by the cyclically varying voltage 29B shown in Figure 5. It is observed that these voltage variations 27A and 29B have portions thereof shown in heavy lines, and it is these portions which are used to effect control operations, and which are selected upon alternate closure of the isolating switches 29A and 28A, respectively. These switches 29A and 28A are operated in synchronism with the shaft 26 by mechanical connections indicated in dotted lines.

Figure 5 also shows, for purposes of reference, inverted useful elevation beam angle voltage as represented by the oblique lines 27B.

Also coupled to the scanner of the elevation antenna 37 is the elevation unblanking or cathode beam intensifying switch 45, which has one of its terminals connected to the continuous voltage source 46, for purposes of developing an elevation unblanking voltage or gate so timed that its positive value corresponds to the time of effective scanning of the elevation antenna beam. The unblanking or beam intensifying switch 47 is similarly coupled to the scanner of azimuth antenna 37, with one of its terminals connected to the continuous voltage source 48 for purposes of developing unblanking or intensifying voltages so timed that the positive portions of such voltage correspond to the time of effective scanning of the azimuth antenna beam. Relay switch 49 operates at substantially the same time as switch 47, and synchronously therewith serves to generate the so-called Az.-El. relay voltage or gate (Figure 5A) which is so timed that its positive portion begins at a time just prior to the beginning of the azimuth unblanking voltage and just after the end of elevation unblanking voltage, and which ends at a time just after the ending of the azimuth unblanking voltage and just prior to the beginning of the elevation unblanking voltage, all as seen in Figure 5A.

Figure 4 shows a schematic diagram of the time relations involved in a scanning cycle, which typically occupies a time in the order of one second. Forward progress of time is represented by clockwise motion about this diagram. The central circular region of Figure 4, marked N, shows the time schedule of the scanning operations of the two systems, opposite quadrants representing complete scans by the same system but carried out in opposite directions. The shaded areas (each comprising roughly 10° of the complete 360° cycle) represent the periods during which the transmitter 34 is switched by the switch 36 in Figure 2A from one antenna to the other. Unshaded areas of region N represent the time periods during which one or the other of the antennas is in use, sending out radio frequency pulses and receiving reflected echo signals from objects within the field of coverage of the beam. Shaded areas indicate inactive periods during which switching takes place, both antennas being momentarily isolated from the transmitter and receiver.

The inner annular region M of Figure 4 represents the time schedule of the related azimuth and elevation displays, subject, however, to pattern clipping described later, and corresponds to the cyclical variations of azimuth and elevation voltages represented in Figure 5A and applied to the intensity control electrode, i. e., grid 51A, of the cathode ray tube 51, using the switches 45 and 47 for that purpose. Unshaded areas represent parts of the cycle during which this grid voltage is applied, shaded area periods when this grid voltage is cut off, making the tube inoperative, i. e., dark, even in the presence of video signals and sweep intensifying voltages applied respectively to the cathode 51B and grid 51A in the manner described later.

The outer annular region of Figure 4, marked L, shows the time schedule of currents through the various coils of a number of so-called Az.-El. switching relays for effecting time sharing. The relay actuating current is obtained by the switch 49 operating in synchronism with the mechanism producing azimuth antenna beam scanning.

More specifically, in Figure 2A, the wave guide transmission line 53 leads from the transmitter 34 and receiving system 35, 39. A T-joint 54 divides this transmission line into two branches 55 and 56, leading through switch assembly 36 to the azimuth and elevation assemblies 38, 37, respectively. These branches have suitably placed shutter slots which receive the rotating shutters 57 and 58, respectively. These are mounted on the common drive shaft 26, driven by the motor 59, and have two blades each arranged in opposite fashion, so that when one antenna transmission branch is opened, the other will be blocked by its shutter. The shutter blades 57, 58 cover angles of approximately 100°, leaving openings of 80° as required by region N of Figure 4.

The same drive shaft 28 operates the two antenna beam scanning mechanisms, represented by the dotted lines 60, 61, and assumed to be of the construction in the above mentioned Allebach application and built into the antenna assemblies. In the showing of Figure 2A, the eccentric cams 62, 63 on shaft 26 operate the beam scanning mechanism. Since each of the cams 62, 63 has one lobe, while its associated shutter 57 or 58 has two lobes, one opening in the shutter will find the antenna scanning in one direction, the other in the other direction. The azimuth and elevation blanking switches 45 and 47 are shown schematically in Figure 2A as cam actuated, being operated by the two-lobed cam 64, for purposes of establishing the unblanking or intensifying voltages represented in Figure 5A.

The Az.-El. relay switch 49 is operated by the cam 65 on shaft 26 to control current to the circuit switching relays, the function of which is described hereinafter.

The radar echo signal, when received at the elevation antenna 37 or the azimuth antenna 38, is fed back through the R. F. switch 36 and passed through the tune-receive switch 35 into the receiver 39. Receiver 39 serves to detect the video, and after the video is amplified in the video amplifier stage 50 it is applied to an intensity controlling electrode of the cathode ray tube 51 (Figure 2C), i. e., to the grid 51A. Also applied to the grid 51A are range marks which are developed in the range mark generator 52 in accordance with triggers supplied thereto from the synchronizer 31.

The cathode ray tube 51 has a pair of magnetic deflection coils 67, 68, so arranged as to deflect the associated electron beam substantially parallel to two mutually perpendicular axes, the so-called "time base" axis which is generally, although not exactly, horizontal as viewed by the operator and as shown in Figure 1, and the so-called "expansion" axis which is generally vertical. In general, each basic trigger pulse developed in synchronizer 31 (Figure 2A) is made to initiate a current wave of sawtooth form through the time base deflection coil 67, and a current wave of similar form through the associated expansion deflection coil 68, the current in each coil expanding approximately linearly with time and then returning rapidly to zero. Instead of a linear variation, this variation may be logarithmic in character, as described in the copending patent application of Homer G. Tasker et al., Serial No. 175,168, filed July 21, 1950 now Patent Number 2,737,654, and assigned to the same assignee as the present application.

The repetition rate of such sawtooth currents is, of course, the same as the pulse repetition rate of the transmitted pulses, and occurs during the expectant period of resulting echo signals. It will be understood that electrostatic deflection of the cathode ray beam may be used instead of electromagnetic deflection, appropriate modifications being made in other parts of the equipment.

Such sawtooth currents applied to the deflection coils 67, 68, however, are "modulated" at a slow rate by currents of much lower periodicity which are produced by voltages, i. e., the beam angle voltages which are produced in accordance with the scanning movement of the antenna beam, and which are shown graphically in heavy lines in Figure 5. Those portions of the voltage indicated in heavy lines in Figure 5 only are used to modulate the sweep voltages on a time sharing basis.

These voltages, as represented by the curves 27A and 29B, may vary from plus two volts at one extreme of the scanning range to plus fifty-two volts at the other end. These particular antenna beam angle voltages, as mentioned previously, are used in effect to "modulate" the amplitude of the sawtooth voltage waves developed in the sweep amplifier shown in Figure 2C and applied at a much higher repetition rate to the expansion coil 68, for purposes of obtaining unidirectional or unidimensional magnification in the cathode ray display in accordance with principles set forth in the copending patent application of Homer G. Tasker, Serial No. 680,604, filed July 1, 1946, now abandoned and assigned to the same assignee as the present application. On the other hand, the amplitude of the sawtooth voltage waves developed in the sweep amplifier and applied to the other quadraturely acting time base coil 67 is likewise modulated to a much smaller degree and in a different manner, for purposes of orientation as described later.

Thus, the amplitude of the currents supplied to coil 68 is automatically varied in accordance with antenna beam angle voltage, so that the angle which any particular cathode ray beam makes, corresponds, on an expanded scale, to the antenna beam angle.

Figure 2B:
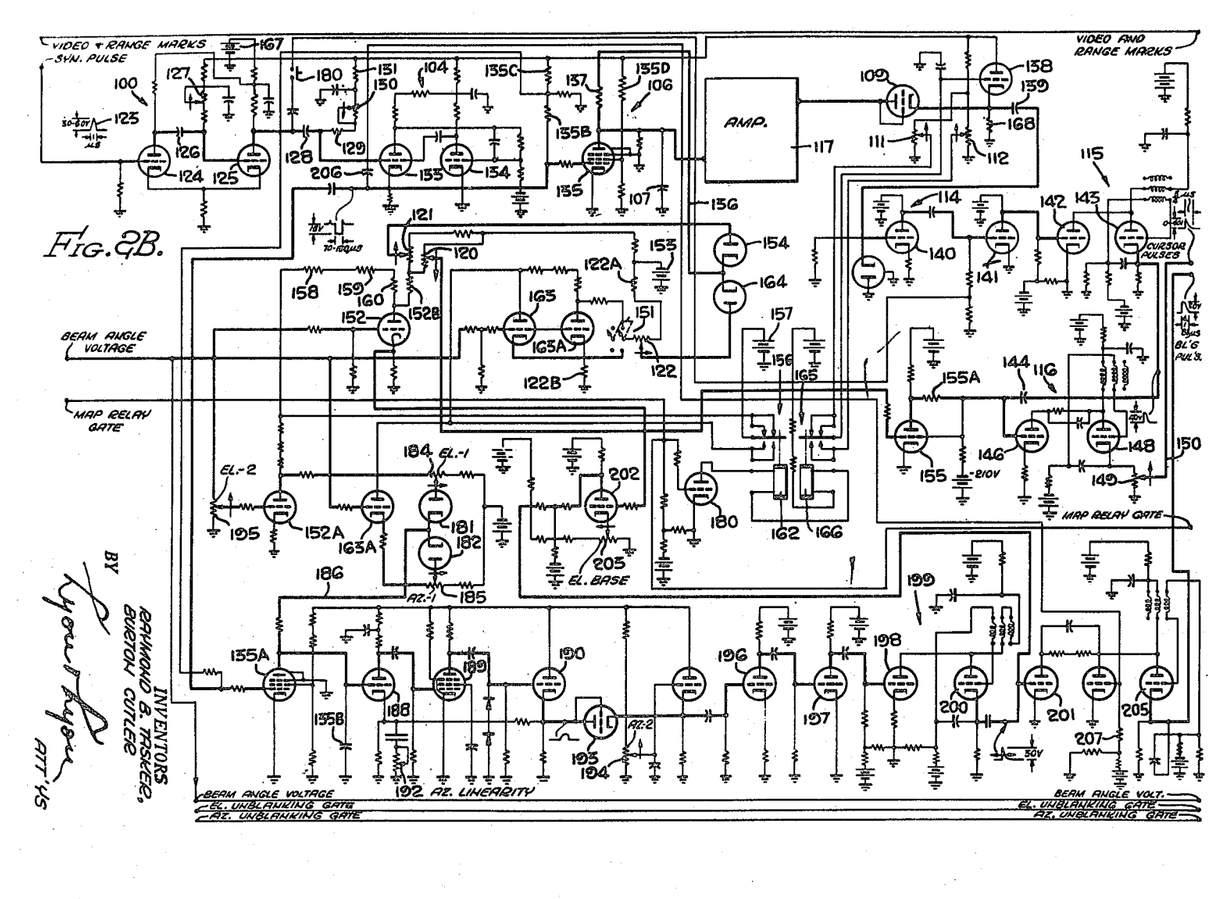
Figure 2C:
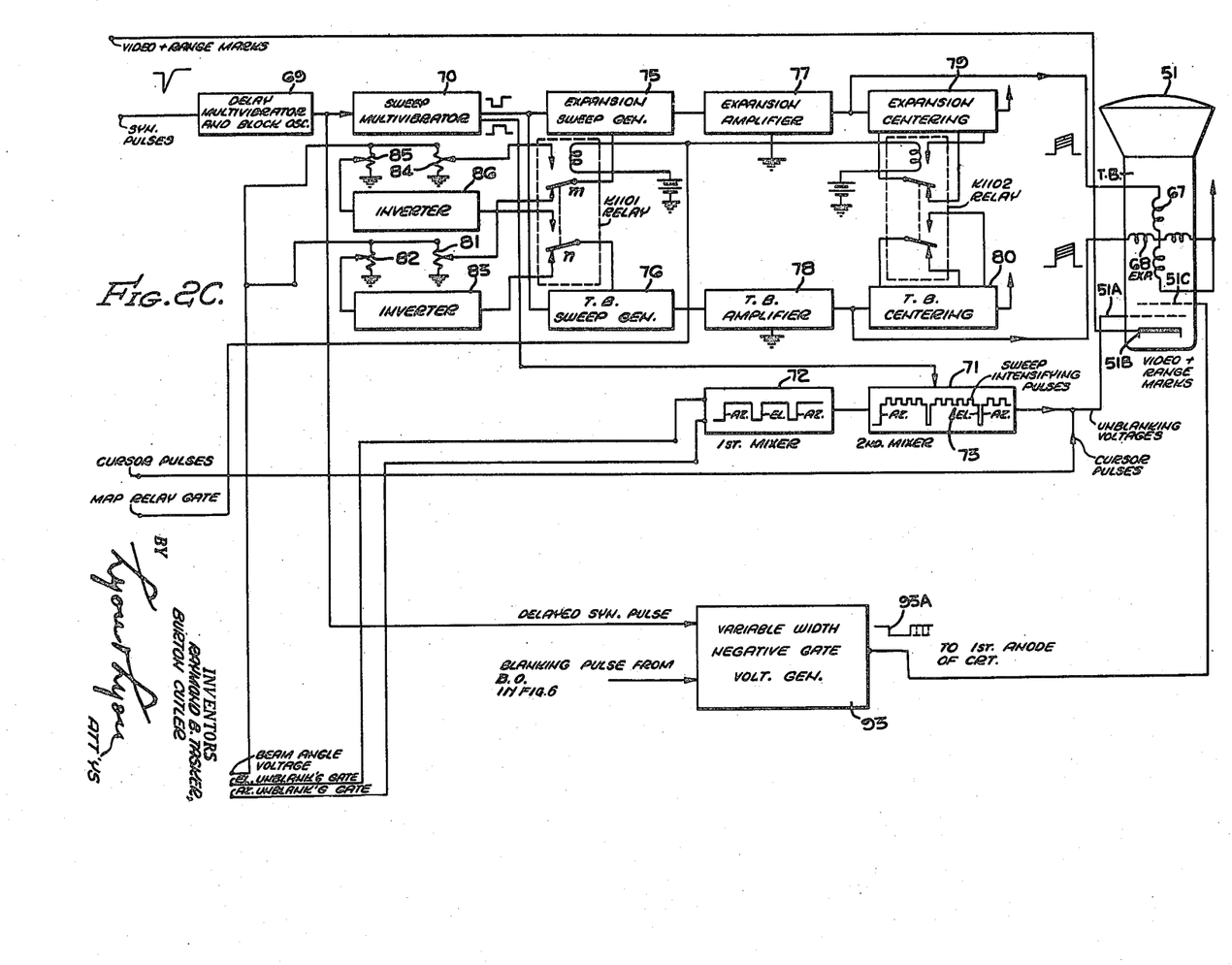

The tube 51 is rendered fully operative for producing visible indications only when suitable intensifying voltages in the form shown in Figures 5A and 2C are applied to its grid 51A, bringing the tube approximately to cut-off condition. A relatively small additional video signal or range mark signal (or cursor pulse described later) then strengthens the cathode beam, making it momentarily visible on the screen as a dot, the position of which is determined by the currents flowing at that particular moment in the set of deflection coils 67, 68.

For purposes of developing suitable deflecting currents in the cathode ray deflection coils 67 and 68, and the sweep unblanking or intensifying pulses indicated in Figure 2C, the sweep generating circuit shown in Figure 2C is supplied with pulses from the synchronizer 31. Such pulses, in the form of triggers, are fed from the synchronizer 31 to the delay multivibrator and blocking oscillator stage 69, the output of which is fed to the sweep generating multivibrator stage 70. The stage 70 generates a gating or intensifying pulse which is fed to the second mixer stage 71 to produce the composite wave form 73 shown in Figures 2C and 5A. This wave 73 comprises pulses of sweep frequency added to the longer azimuth and elevation gating voltages developed in the first mixer stage 72, such first mixer stage 72 serving to combine the gating voltages derived by operation of switches 45 and 47 in the manner described previously. Each element of the composite wave 73 is required to be present to bring the cathode tube 51 up to the point of cut-off during application of sweep currents to the coils 67 and 68. A negative gating voltage is also generated in the stage 70 and fed to the expansion and time base modulator stages 75 and 76, respectively, and from them in modulated form through expansion and time base amplifiers 77 and 78. The output of amplifiers 77 and 78, in the form of essentially trapezoidal waves of appropriate amplitude are applied to the expansion deflection coil 68 and the time base deflection coil 67, respectively, causing current pulses of linear sawtooth form in the coils. Expansion and time base centering circuits 79 and 80 are also connected to the deflection coils. The modulator stages 75 and 76, for purposes of modulation, receive antenna beam angle voltages via switches m and n, respectively, of relay K1101.

With the relay unactuated (as shown) the elevation beam angle voltage appearing on the potentiometer resistance 81 is applied through switch m to the expansion modulator 75; and through potentiometer resistance 82 and inverter 83 and switch n to the time base modulator 76. After completion of the elevation scan, relay K1101 is actuated by switch 49, breaking the elevation beam angle voltage connections just described, and connecting the azimuth beam angle voltage through potentiometer 84 and switch m to the expansion modulator; and through potentiometer 85, inverter 86 and switch n to the time base modulator.

The potentiometers 81, 82, 84 and 85 control the amplitudes of the antenna beam angle voltage supplied directly to the expansion modulator 75 and supplied indirectly through the inverter to the time base modulator. Thus, the degree of modulation of sweep current, and hence the degree of angle expansion of the display, may be separately regulated for the azimuth display by adjustment of the potentiometer 84, and for the elevation display by adjustment of potentiometer 81; and the degree of modulation of the time base sweep current, and hence the apparent angle between the range marks and the time base, may be separately regulated for the azimuth display by adjustment of potentiometer 85, and for the elevation display by adjustment of the potentiometer 82.

The centering circuits 79 and 80 in Figure 2C are individually capable of two separate adjustments, one effective when relay K1102 is actuated (azimuth display) and one when the relay is unactuated (elevation display) to determine the positions of the points $O_2$ and $O_1$, respectively, in Figure 1. Thus, the origins of azimuth and elevation displays are separately adjustable, the centering circuits automatically responding to one or other set of adjustments according to the energized condition of relay K1102. A schematic diagram showing centering circuit for expansion deflection coil is shown in Figures 2C and 7.

The deflection coil 68 in Figure 7 is connected between a 700-volt positive supply and two parallel circuits, one leading to ground through tube V1116, which is the final stage of expansion amplifier 77, and the other leading through choke coil L1101 and centering tube V1117 to a 1000-volt positive supply. The first of these two circuits feeds to deflection coil 68, the periodically varying sweep producing component, while the second circuit provides a relatively constant but adjustable centering current component. The cathode resistor of centering tube 68A is made up of two parallel connected potentiometers R1158 and R1159, the movable contacts of which are connected respectively to the normally closed and normally open contacts of switch m or relay K1102. A switch arm is connected through grid resistor R1157 to the tube grid. The grid bias, and hence the centering current through the tube and through the coil 68 thus depends upon the position of relay switch m being determined by the setting of potentiometer R1159 when relay K1102 is actuated (azimuth display) and by the setting of potentiometer R1158 when the relay is not actuated (elevation display). The two displays are therefore separately adjustable as to their vertical position (expansion component) on the indicator tube by means of the two potentiometers.

Time base deflection coil 67 is provided with centering circuitry which is identical to that in Figure 7 and functions in a like manner, controlled by switch n of relay K1102. In fact, by appropriate changes of the numerals and lettering, Figure 7 may be considered to illustrate the time base centering circuit. The potentiometers then provide separate adjustments of the elevation and azimuth displays with respect to their horizontal positions (time base component).

Pattern limiting or clipping

The azimuth and elevation displays 11, 10 in Figure 1 are clipped or limited by means which form an important part of the present invention. The azimuth display 11 may be clipped or limited along the line LM and the elevation display 10 clipped or limited along the line KJH by means described in detail herein. Such means include the unit 93 shown in Figure 2C, the output of which is applied to the first anode 51C of the cathode ray tube 51 in the form of a negative blanking voltage 91, the position of which is shiftable along the time axis in a degree depending upon the particular value of azimuth or elevation beam angle voltage, as the case may be. For this purpose, the unit 93 is supplied with delayed synchronizing pulses from the delay multivibrator 69, and is likewise supplied with an L blanking pulse as indicated in Figure 2C.

Although certain broad aspects of the present invention are described in relationship to the production of electronically produced glide path line AB and runway line CD in Figure 1 on the elevation and azimuth displays, respectively, the present invention is particularly useful in providing the so-called L triggers described herein for pattern limiting purposes, but the present invention may be used for other purposes, where other distinguishing lines on the displays are to be produced or certain control apparatus operated at predetermined spaced regions in the pattern and, as for example, as demonstrated in the copending application of Robert W. Landee et al., Serial No. 247,616, filed September 21, 1951, the L triggers developed herein may be used in the gated video system described therein for accomplishing the same purposes as the L triggers mentioned and indicated in such copending application, Serial No. 247,616. As a matter of fact, certain portions of the apparatus described herein constituted the so-called map generator in such copending application.

Figure 6:
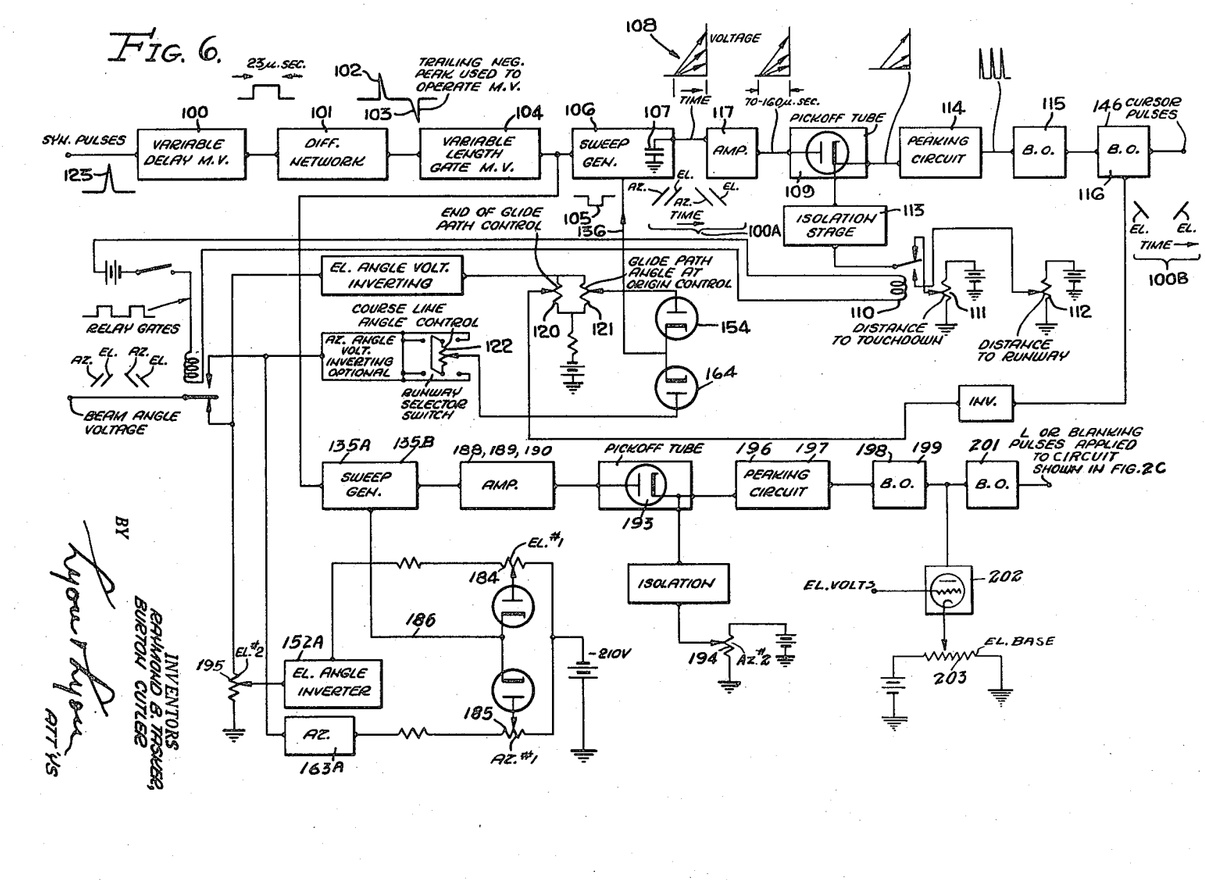
Figure 6 is a schematic representation showing the apparatus of Figure 2B in more simplified form.

Briefly, such apparatus for producing pattern limiting or clipping serves to produce a so-called L trigger or blanking pulse instantaneously upon the deflected cathode ray beam reaching the line LM or the lines KJH at the terminal designated as such in Figures 6 and 2C. Such L or blanking pulses may be used as indicated in Figure 2C to terminate, at critical variable times, the negative gating voltage initiated in the variable width negative voltage generator stage 93 by the delayed synchronizing pulses supplied from the delay multivibrator stage 69. The output of the stage 93 is applied to the first anode 51C of the cathode ray tube to produce blanking or darkening of the tube under the stated conditions, i. e., when the cathode ray beam reaches the line LM or the lines KJ or JH in the process of producing the displays.

Glide path and runway course line producing means

Figure 9:
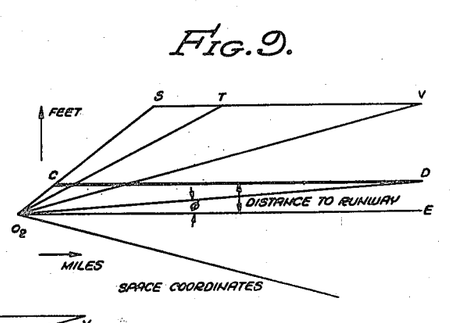
Figures 9 and 10 are graphs helpful in understanding the interrelationship of physical and electrical quantities and result produced by the apparatus described herein in producing the runway course line when the radar apparatus is located for "left of runway" operation.
Figure 10:
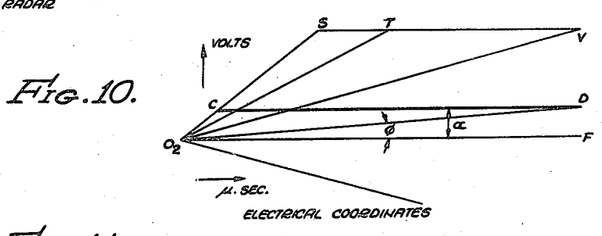

The glide path AB and runway line CD are formed by a series of cathode ray intensifying pulses which are produced when the cathode ray beam, swept outwardly from the center $O_1$ or $O_2$, as the case may be, reaches these positions. In other words, the time at which such intensifying pulses are applied is determined by the angular position of the cathode ray sweep, i. e., the antenna beam angle voltage, which is a measure of the angular position of the corresponding antenna beam, and the time required for the cathode ray beam to move from the center $O_1$, $O_2$, as the case may be, to the corresponding lines AB and CD. This interrelationship between intensifying pulses, i. e., cursor pulses, time and angular position of the particular cathode ray sweep is illustrated in Figures 9 and 10, which serve to correlate the actual physical relationship of the glide path or runway line, as the case may be, to the electronically produced lines. It will be noted that electrical voltage (beam angle voltage) is used to represent the angular orientation of specific points on the actual glide path and runway lines, while time of electron beam travel serves as a measure of the distance to such specific point.

The method of approach to the solution of the problem may be explained as follows. If the aircraft, i. e., target, is assumed to be flying exactly along the desired glide path, its progress is indicated on the cathode ray tube by a spot which traces out the glide path position. The location of this spot on the tube face is determined by the magnitude of the expansion voltage applied to the modulator stage 75 (Figure 2C), and such spot is determined also by the time required for the transmitted radar pulse to travel from the equipment adjacent the aircraft landing strip to the aircraft and back again to the equipment. For each value of angle voltage, the time delay created must equal the time of pulse travel to and from the corresponding point on the glide path. Thus, for every spot on the glide path, there exists one and only one value of time delay, and elevation beam angle voltage or azimuth beam angle voltage, as the case may be.

Figure 3:
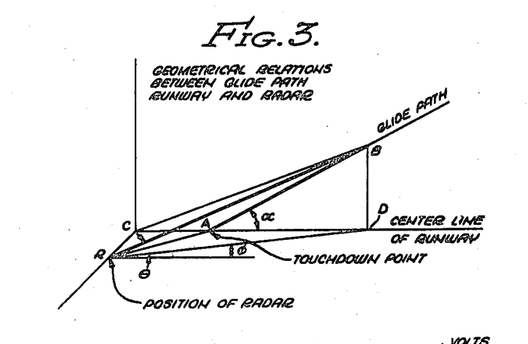
Figure 3 is a three-dimensional representation useful in explaining the problems involved and solutions made in accordance with the present invention.

Thus, Figure 3 shows a three-dimensional geometrical representation of the desired safe aircraft glide path. The line CD represents the center line of the runway and the line AB is the glide path, intersecting the runway at the touchdown point A at a vertical angle alpha. The location of the radar antenna is at point R, and RB is a straight line drawn from the antenna intersecting the glide path at point B. Theta is the angle of elevation of line RB, and phi is the azimuth angle measured between the projection of RB on the horizontal plane, and a line parallel to the center line of the runway. Theta and phi, therefore, represent respectively vertical and horizontal angles associated with the radar antennas when they are directed at a point on the glide path. With the radar in any fixed location with respect to the runway, and with a fixed glide path angle, the distance RB is a unique function of either theta or phi.

Using this geometry and certain approximations, graphs or curves may be drawn showing the relationship between angle voltage and time delay. These curves, while not shown here, may be represented, as a close enough approximation, by the following expression:

$$T = \frac{1}{b - cV} + a$$

where $a$, $b$ and $c$ are constants, $V$=azimuth or elevation beam angle voltage, as the case may be.

A circuit is provided in which this relationship between time delay and angle voltage may be realized, i. e., a circuit is provided to operate in accordance with analogue computer principles to achieve the aforementioned results. It will be observed that the circuit described in detail hereinafter for this purpose produces a time delay dependent upon angle voltage in accordance with the following expression:

$$T = \frac{K}{M} + T_0 = \frac{K}{V_0 - V} + T_0$$

where $m$ is the slope of the generated sawtooth wave, $T_0$ is a constant time delay, $V_0$ is the angle voltage corresponding either to the glide path angle or approach line angle in the azimuth display, and V is the corresponding azimuth or elevation angle voltage.

It will be further observed that the glide path and runway lines are determined essentially by two adjustments, i. e., the corresponding straight lines are determined by two adjustable points on corresponding lines.

The desired result obtained by the circuit described hereinafter may perhaps be understood better by comparing physical or space coordinates of miles and feet with corresponding electrical coordinates of time and voltage. Thus, in Figures 9 and 10, $O_2S$, $O_2T$, etc., represent either antenna beams in space or portions of voltage sawteeth which in turn correspond to cathode ray tube beam sweeps. The circuit described hereinafter functions to produce a trigger each time a sawtooth $O_2S$, $O_2T$, $O_2V$, etc., intersects a voltage represented by the line CD, and these triggers are used to intensity modulate the cathode ray tube so that there is produced electronically a line CD corresponding to the runway course line CD.

Figure 11:
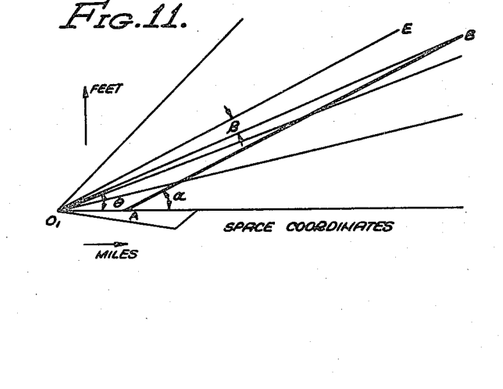
Figures 11 and 12 are graphs likewise helpful in understanding the interrelationship of physical and electrical quantities and result produced by the apparatus described herein in producing the glide path course line, and is further helpful in understanding the manner in which the runway course line is produced when the radar apparatus is located for "right of runway" operation.
Figure 12:
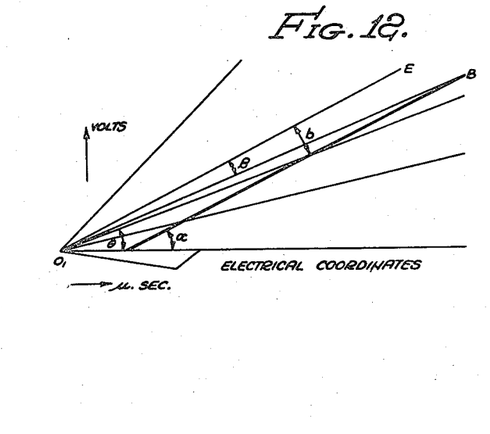

Similarly, Figures 11 and 12 show an elevation or right of runway picture; here a similar transfiguration is made from space to electrical coordinates. The sawtooth voltages intersect the inclined line AB which corresponds to the glide path course line AB in Figure 11. The delay in time before the horizontal sawtooth $O_1A$ intersects the line AB is a measure of the touchdown distance $O_1A$ in the elevation display. It is desired, for purposes of simplification of the equipment, to define the glide path line AB in Figure 12 as a line which extends parallel to a reference line $O_1E$ passing through the origin O, to simulate the condition in the azimuth display in Figure 10, wherein the runway course line CD extends parallel to the reference line $O_2F$ passing through the origin $O_2$. These lines $O_2F$ and $O_1E$ in Figures 10 and 11 thus represent reference voltages, the production and control of which form important aspects of the present invention.

More specifically, the presentation of a runway course line in the azimuth display, and the glide path course line in the elevation display, is accomplished by modulating the CRT beam, moving from bottom to top, with a series of intensifying voltages (cursor pulses) which occur at increasingly shorter intervals (from the point of origin) on the azimuth display, and at increasingly longer intervals on the elevation display. The underlying principle of creating these cursor pulses involves generating a series of sawteeth (of relatively short duration), each one of which reaches the same relative voltage magnitude as the applicable segment of antenna beam angle voltage. The sawteeth are made to originate at times which are simultaneous with the origin of the time base sweep voltages. The pulses are then formed at a constant voltage point on the slope of each sawtooth to simulate the condition set forth in Figure 10, using the parallel reference line $O_2F$ or, in the elevation display, the parallel reference line $O_1E$. It should be carefully noted that these lines $O_2F$ and $O_1E$ correspond to a single value of azimuth and elevation angle voltage, respectively. The duration of each sawtooth is the same, and since the slope of each succeeding sawtooth is more steep (or less steep, depending upon the scanning direction) a point of constant voltage on the slope of each sawtooth represents decreasing intervals of time from a constant point of origin. When the slope of each succeeding sawtooth is less steep than its predecessor, the time interval between the point of origin and a constant voltage point becomes greater. Referring to Figure 10, it is apparent that although the application between increasing voltage and decreasing time is direct for establishing cursor pulses in the azimuth display, this relationship requires inversion in the elevation display with reference to Figure 12. Inversion is also required for the azimuth display in a "right of runway" installation. The fact that the ratio of antenna beam angle voltage to sawtooth voltage takes different directions for the azimuth and elevation displays, makes two separate modulation circuits necessary. The starting point for the generation of sawteeth is determined by the required angle of azimuth or elevation display (corresponding to phi and theta in Figures 3, 9, 10, 11, 12) at which the cursor pulses are to start, and a voltage magnitude of zero is established for the sawtooth at this point. It should be carefully noted that the radial lines O₂D and O₁B which determine such angle correspond to a unique value of azimuth and elevation beam angle voltage, respectively.

In general, the sawteeth produced are amplified and fed into a diode pickoff stage. Bias level of this stage determines the point on the slope of each sawtooth at which conduction takes place. This results in the formation of sawteeth having points of origin that differ from the original points by an amount determined by the bias level of the pickoff diode. The derivation of this bias level in elevation is the touchdown control, which varies the distance between the point of the time base sweep origin to the reference point of touchdown. The derivation of this bias level in azimuth is the runway control, which varies the distance between the point of the time base sweep origin to the reference point of touchdown on the runway centerline. The output from the pickoff diode is peaked and sent to a trigger forming circuit which produces the cursor pulses. The cursor pulses in the form of positive pulses are applied to the control grid 51A of the CRT 51 for sweep intensification.

In general, the cursor pulses applied to the control grid 51A of the cathode ray tube, for purposes of producing the glide path course line AB and runway course line CD, are initiated, one per cathode ray beam sweep, in timed relationship with synchronizing pulses developed in the synchronizer 31 and applied to the circuitry shown in Figures 6 and 2B; however, it should be carefully observed that this apparatus shown in these two figures functions to impart a predetermined unique time delay to each of such cursor pulses in accordance with the particular angular position of the cathode sweep, i. e., in accordance with the particular magnitude of the antenna beam angle voltage which, of course, serves as an indication of the position of the radiated antenna beam as well as determining such corresponding angular position of the cathode ray sweep.

Briefly, with reference to Figure 6, the synchronizing pulses 123 are applied to a channel which includes the variable delay multivibrator stage 100, the differentiating network 101, the variable length gate multivibrator stage 104, the sweep generator stage 106, the amplifier stage 117, the diode pickoff or clipping stage 109, the peaking circuit 114, and the first and second blocking oscillator stages 115 and 116, and the output of such stage 116 is applied to the cathode ray tube control grid 51A. The operation of this aforementioned channel is effected by the magnitude of either azimuth or elevation beam angle voltage, as the case may be, applied to the sweep generator stage 106 in the form indicated at 100A. It is remembered that these azimuth and elevation beam angle coupling voltages are developed and applied alternately to the sweep generator stage 106. The magnitude of these voltages thus applied to stage 106 determines the position of the point B in the elevation display and the position of the point D in the azimuth display. At angle voltages greater than that corresponding to the sweep O₂D, the sweep generator is rendered fully operative to deliver sawtooth voltage variations in timed relationship with pulses 123, such sawtooth variations then increasing in magnitude with increase in angle voltage on the lead 136 to produce the series of sawtooth waves represented at 108. Similarly, with reference to the elevation display (since inverted elevation angle voltage appears on the lead 136), the absolute value of the angle voltage appearing on the lead 136 is relatively small when the sweep occupies the position O₁B, and is relatively large when the sweep occupies the position O₁A. The threshold values of angle voltage for determining the position of point D in Figure 10 and the position of the point B in Figure 2 is established by the position of the movable taps on the potentiometer resistances 122 and 121, respectively. These sawtooth waveforms 108, thus formed after this threshold value of angle voltage appears on the lead 136, are amplified in stage 117 and applied to the pickoff or clipping stage 109, where, during the azimuth display, such sawtooth waves have their initial portions clipped, i. e., rendered ineffective as determined by the amount of positive voltage appearing on the cathode of the tube 109. The voltage applied to such cathode during the azimuth display is a constant one and is represented by the distance $a$ in Figure 10. Thereby such constant voltage applied to the cathode of the pickoff tube establishes the distance of the line CD with respect to O₂F. During the elevation display a constant voltage is applied to the cathode of tube 109, thereby establishing the distance of the line AB with respect to O₁E as represented by the distance $b$.

Thus, recapitulating, the runway course line CD in the azimuth display is determined by establishing first the slope from the point D, using the control 122, and then establishing the distance of the point D from the reference line OF by the distance to runway control 112. Similarly, the glide path course line AB is determined by establishing the slope from point B, using the control 120, and using the control 111 to establish the distance of the point B from the reference line O₁E.

More specifically, in obtaining the aforementioned result, the system trigger 123 (Figures 6 and 2B) appears on the grid of the quiescent half of the delay gate multivibrator tube 124 and initiates a positive gate on the anode of tube 125. The length of the gate is determined by the "Line Adjust" potentiometer resistance 127, which is normally set for a delay of 23 microseconds to be coincident with the pulse transmitted from the antennas. The trigger thus delayed is differentiated by the network comprising condenser 128 and resistance 129, and the resulting trailing edge triggers are applied to the normally conducting tube 133. The tube 134 aids in establishing the map length sweep gate (negative going) at the cathode of tube 133. The length of this developed gate is variable between 70 to 130 microseconds, which corresponds to 6 to 10 miles, by adjustment of the "Az.-El. Map Length" potentiometer resistance 130. This gate is then fed to the grid of the cursor sweep clamp tube 135 and also, for purposes described later, to the limiter sweep clamp tube 135A.

The stage 106, which includes the tube 135, includes also the condenser 107 having one of its terminals grounded and the other one of its terminals connected to the anode of tube 135. The tube 135 normally, in its quiescent stage, conducts heavily since its control grid is connected through resistances 135B and 135C to the positive terminal of source 167. It is noted further that the screen grid of tube 135 is likewise connected to the source 167 through resistance 135D. The anode of tube 135, however, is connected to the cathodes of tubes 154 and 164 through lead 136. The anode of tube 135, and hence the condenser 107, are thus essentially at the same potential as the cathode of tube 135, namely, at ground potential. When the negative gating voltages are applied to the grid of tube 135, such grid is driven below the point of conduction and the condenser 107 is thus allowed, during the duration of such gate, to be charged to a maximum value determined by the particular magnitude of the angle voltage appearing at that time on lead 136. Thus, when the flow of space current through tube 135 is interrupted by such negative gating voltages, the angle voltage appearing on the lead 136 charges condenser 107 through resistance 137.

It should be noted, however, that during certain portions of the cathode ray beam scanning cycle, the antenna beam angle voltage is insufficient in magnitude to conduct through the tube 154 or 164, as the case may be, and in such case there is of course no charging of the condenser 107. This condition corresponds in Figure 10 to the region on the display below the sweep O₂D; and corresponds in Figure 12 to that portion of the display above the sweep O₁B.

The manner in which antenna beam angle voltage is supplied to the lead 136 is described in detail hereinafter, and for the present purposes it will be assumed that there is an antenna beam angle voltage present on the lead 136, varying of course at a relatively slow rate, for effecting charging of the condenser 107 periodically at the repetition rate of the gating voltages applied to the grid of tube 135. It should be noted that the sawteeth represented as such at 108 in Figure 6 are caused to vary in amplitude in proportion to azimuth angle voltage in the azimuth display, and inversely proportional to elevation angle voltage in the elevation display.

These voltage variations thus appearing on the condenser 107 are applied to the amplifier stage 117 in the form of a series of rising sawtooth voltages in the azimuth displays, and a corresponding series of decreasing sawtooth voltages in the elevation displays, each starting from substantially zero voltage and rising to the voltage present on the lead 136. In other words, the voltage on lead 136, once a predetermined threshold value is applied to the anodes of tubes 154 and 164, is slightly higher at each cathode ray beam sweep for azimuth (normal installation) "up" scan and elevation "down" scan, and slightly lower each sweep period for azimuth "down" scan and elevation "up" scan.

It should be carefully noted that the duration of each succeeding sawtooth voltage wave developed in the stage 106 is equal, but that the changing amplitude results in successively greater or successively lesser slopes.

These sawtooth waves, after amplification in the stage 117, are applied to the anode of pickoff diode tube 109. The tube 109 conducts at an input level determined by the negative bias existing on its cathode. The source of this cathode bias is isolated by the tube 138. This is accomplished by connecting the cathodes of tubes 109 and 138 together and to the ungrounded terminal of resistance 168, and by applying suitable control voltages to the grid of tube 138. During the azimuth scan, the amount of such control voltage is determined by the position of a tap on potentiometer resistance 122, such tap being at a positive potential with respect to ground. The bias voltage on the cathode of tube 109 is alternately changed, depending upon whether or not the elevation or azimuth antenna is scanning through space in accordance with the energized condition of the Az.-El. relay 165, which serves to alternately apply voltage from the adjustable tap on potentiometer 111 or 112 through the isolation stage 138 to the cathode of tube 109. The sawtooth waves thus applied through condenser 139 are subjected to the peaking circuit 114 which includes the tube 140, and then in succession to a first blocking oscillator stage 115 and then to a second blocking oscillator stage 116.

In the peaker stage, which comprises the tubes 140 and 141, the degree of slope of each sawtooth is more sharply defined into a pulse waveform which is then applied to the grid of the blocking oscillator buffing amplifier tube 142. The time base follows the pattern of the varying sawtooth slopes, with the steeper sawtooth slopes representing shorter time intervals. For example, when the angle voltage rises as a result of the azimuth antenna "sweeping left to right," the point of zero magnitude sawtooth is determined by the setting of the "Course Line Angle" potentiometer 122. At the plate of the tube 109 the setting of the "Distance to Runway" potentiometer 112 determines the steepness of slope required before sawteeth may appear at the grid of the peaker circuit. It will be observed that the first pulse to appear in the oncoming series has the smallest slope, and as a consequence requires the greatest time to produce a trigger in the blocking oscillator circuit 115; whereas, the final trigger in the series has the steepest slope, and requires the least time to form a trigger. In a normal "left of runway" installation display, the first trigger to appear in the blocking oscillator circuit 115 serves to plot the extreme end of the runway course line, i. e., the point D, and each resulting succeeding trigger establishes points on the line CD closer to the origin O₂.

During "up" elevation scan periods the voltage appearing on the movable tap of the "End of Glide Path" resistance 120, in the form of inverted elevation angle voltage, is applied to the control grid of the bias forming tube 155. The anode of tube 155 is connected through resistance 155A to the control grid of tube 146, to thereby establish the bias on tube 146 in accordance with inverted elevation angle voltage during the elevation scanning period only, it being noted that the bias level established at this point during azimuth scan periods is a steady one, sufficient to maintain tube 146 just under the point of conduction until the first pulse is transferred thereto from the cathode of tube 143 through the coupling condenser 144. During elevation scanning periods, however, this inverted elevation angle voltage appearing on the grid of tube 155, normally in a cut-off condition, causes the tube 155 to rise to a highly conductive level which steadily decreases. Consequently, the voltage on the anode of tube 155 initially drops suddenly to a low value, and slowly rises as the elevation angle voltage increases. During this upward cycle of elevation scan, the amplitude of the triggers appearing at the grid of tube 146 steadily decreases, which means that the progressive amplitude changes of bias and triggers are in opposing directions. The amplitude of the bias change, however, is variable by means of the "End of Glide Path" potentiometer resistance 111, which allows the tube 146 to be cut off at a predetermined point near the end of the elevation trigger train. This, of course, determines the glide path course line reproduced on the cathode ray tube screen. Thus, it is observed that the grid of the second blocking oscillator driver tube 146 is biased by inverted elevation angle voltage such that any triggers developed below an arbitrary angle voltage in elevation may be cut off. Thus the operator may stop the glide path at ground level (touchdown) if he so desires, i. e., the position of the tap on resistance 120 determines the termination of the glide path line precisely at point A. It is observed that this circuit does not affect the azimuth triggers, so that the runway line CD does not terminate at the touchdown point but continues past the touchdown point. During the reverse scanning cycle of the azimuth and elevation antennas, angle voltage is also reversed. Since the progress of the time base and expansion deflection voltages is also reversed on the displays, the relationship of the course line cursor pulses remains fixed.

It is observed that in the upper left hand corner of Figure 2B a switch 180 is provided, which, when closed, serves to present a strobe on the display to indicate the origin of the sawteeth. Using this sweep 180, the observer may adjust the resistance 127 to effect the proper delay in the multivibrator stage 100 without using a synchroscope.

Recapitulating, during the azimuth scanning period, the 30-volt relay gate developed at the start of the azimuth scanning period and lasting during such period energizes relay tube 180, which draws current through relay windings 162 and 166. This causes closure of the +300- volt D.-C. supply circuit 157 to the anodes of the tubes 163 and 163A. The grid of tube 163 comprises a part of the input circuit of the azimuth cursor channel modulator circuit, and receives the antenna beam angle voltage (+2 volts to +52 volts) produced by the antenna coupling units. Since the action of relay 156, having control winding 162, cuts off the plate supply to this tube 163 during elevation scan periods, it reacts only to angle voltage coming from the azimuth antenna angle coupling unit. The cathode output of tube 163 goes through the lower closed contact of single pole single throw switch 151 into a voltage divider circuit comprising resistors 122A, 122B and "Course Line Angle at Origin Control" potentiometer 122. The tap on this potentiometer 122 serves to adjust the negative D.-C. voltage level on lead 136 to thereby determine the angle of the runway course line at the point of origin, i. e., to establish the position of the line O₂D in Figures 9 and 10. The position of the tap on potentiometer 122 determines the angle between lines O₂F and CD in Figure 10; the tap is adjusted to make this angle zero degrees. During further "upward" azimuth scan, the cathode of tube 164, i. e., lead 136, delivers positive-going angle voltage to the anode of sweep clamp generator tube 135. Before proceeding further with the events occurring during the azimuth scan, the manner in which the elevation beam angle voltage is applied to the tube 135 during the elevation scan is first described.

During periods of elevation antenna scanning, relay tube 180 becomes inactive, and relays 156 and 165 return to their normal position shown in Figure 2B. Under this condition, the source 157 is connected to supply space current to the tubes 152 and 152A. Tube 152 receives, at this time, elevation beam angle voltage on its grid and reproduces inverted elevation angle voltage on its plate circuit in the form indicated at 27B in Figure 5. The inverted elevation angle voltage is applied through the voltage divider circuit, comprising resistor 152B in series with "Glide Path Angle at Origin Control" potentiometer 121 to the plate of cathode follower 154 and the aforementioned lead 136. The position of the tap on potentiometer 121 determines the angle of the glide path AB by determining the point on the slope of the elevation beam angle voltage at which tube 154 starts conducting.

The functional operation of the circuit, for a complete scanning period, is as follows: Angle voltage, starting at 2 volts, and rising to 52 volts, is received from the azimuth antenna angle coupling unit and enters the circuit coincident with the reception of the +30-volt relay gate from the azimuth antenna blanker switch. The angle voltage reaches its peak of 52 volts in slightly less than ¼ second. During this period the azimuth antenna completes its scan from left to right (normal "left of runway" installation). If the installation is on the right side of the runway (from the pilot's view), switch 151 is in "right of runway" position, and input to the plate of tube 164 is applied from the anode of tube 163A, the azimuth angle voltage in such case being inverted. Thus inverted azimuth beam angle voltage is applied to the cathode of tube 164, i. e., lead 136, and operation is similar to that described above for the formation of the elevation cursor pulses. The next cycle begins when the elevation antenna beam starts scanning upward and the rising elevation beam angle voltage is applied to the grid of tube 152 substantially coincident with the cessation of the map or Az.-El. relay gate.

*Map limiting or map clipping*

As mentioned previously, the particular means used for pattern limiting or clipping forms an important part of the present invention.

Briefly, instead of providing cursor pulses which are applied to the control grid of a tube to intensify the same, corresponding pulses, i. e., blanking or L pulses are produced to terminate or render invisible selected portions of cathode ray beam sweeps. Thus, these L or blanking pulses may, as indicated in Figure 2C, be applied to a variable width negative gating voltage generator 93 to terminate at selected periods of time negative gating voltages 93A initiated in timed relationship with delayed synch pulses originating in the synchronizer unit 31. The resulting negative gating voltages of variable length are then applied to the cathode of the cathode ray tube. In such case the cathode ray tube is adjusted so that the video and range marks likewise applied to the cathode appear visibly on the cathode ray tube screen only during the duration of such negative gating voltages. Thus, if on a linear presentation the azimuth course line were moved up to the elevation level, and triggers were used to terminate unblanking gates, and if the elevation cursor were cut off for all angles above that of zero degrees, one would have an Az.-El. sweep limiter.

Thus, pulses developed for the purpose of limiting the displays are developed in much the same type of circuit as used for developing the cursor pulses. The angle voltage modulator tubes 152A and 163A, used in elevation and in azimuth scanning, respectively, receive the corresponding antenna beam angle voltage generated in the angle coupling units. The output from these modulator tubes 152A, 163A is applied to cathode follower tubes 181, 182, respectively, through the limiting controls 184 and 185. The angle voltage appearing on the lead 186 connected to the cathodes of tubes 181 and 182 is transferred to the limiter sweep clamp tube 135A. This modulator circuit is similar to the modulator circuit described above for generation of cursor pulses, with the exception that there is no need for inversion for "right of runway" installations. The end limit of the elevation map is established by the position of the tap on the "El.–1" potentiometer 184, while the angle for end limit of the azimuth map is established by the "Az.–1" potentiometer 185. The angle voltage above a predetermined threshold value is therefore applied to the anode of tube 135A. The action of the sawtooth generating circuit, which includes tube 135A and condenser 135B is generally the same as described above for formation of cursor pulses. The sawteeth thus produced are applied to an amplifying circuit which includes the tubes 188, 189 and 190. This circuit employs degenerative feedback to improve the linearity which is controlled by the "Az.-Linearity" potentiometer 192. The output of this amplifier is applied to the anode of the diode pick-off tube 193, the cathode of which is biased in an amount determined by adjustment of the "Az.–2" potentiometer 194. Variation of the tap on resistance 194 establishes the position of the line LM in the vertical direction in the azimuth display in Figure 1 without changing appreciably its horizontal orientation. The "El.–2" potentiometer 195 serves a like purpose in the elevation display, i. e., establishes the position of line JK with respect to the line O₂L in the azimuth display without changing appreciably its angular orientation. The "picked off" sawteeth are applied to the peaking amplifier tubes 196, 197. The output of this peaking circuit is applied to the grid of the tube 198 in the first blocking oscillator stage 199. The cathode output of the tube 200 is applied to the control grid of the modulator tube 201, to which is likewise applied inverted elevation angle voltage as produced at the plate of the inverter tube 202. It is observed that elevation angle voltage is applied to the control grid of tube 202 in an amount depending upon adjustment of the taps on the "El. Base" resistance 203. Adjustment of this resistance 203 establishes a limit on reproduction of the pulses at the anode of tube 201. Adjustment of resistance 203 establishes the orientation of line JH with respect to LM. Tube 201 thus acts in the same general manner as tube 146 in the cursor pulse circuit, i. e., tube 201 stops limiting at point J. The output appearing on the cathode of the final blocking oscillator tube 205 appears at the terminal marked "Blanking Pulses" and to the stage 93 in Figure 2C, for the aforementioned purpose. These blanking pulses or so-called L triggers, which do not appear because of the biasing action of resistance 203, are replaced with triggers formed by the termination of the map length multivibrator gate from the cathode of tube 133, which gates are differentiated by means of condenser 206 and resistance 207. All of these L or blanking triggers reach an amplitude of approximately +30 volts, have a duration of approximately one microsecond, and are delayed from 8 to 124 microseconds, as measured from the time of the radiated pulse, i. e., from point $O_1$ or $O_2$, as the case may be.

It is observed that the second blocking oscillator driving grid in the pattern limiting circuit is modulated with elevation angle voltage, but in the opposite manner as in the cursor circuit, so that all triggers in the pattern limiting circuit above the horizontal may be gated off.

Recapitulating, from the foregoing description it is clear that the vertical position of the line LM in the azimuth display is controlled by the "Az.–2" control 194, while the angular position of the same line LM is controlled by the "Az.–1" control 185. The position of the line KJ in the elevation display is controlled by the "El.–2" control 195, while the angular position of the same line KJ is controlled by the "El.–1" control 184. It is noted that the point J at which the cathode beam sweeps are allowed to extend further outwardly to the point H in so-called upward scan, is established by the adjustment of the so-called "Elevation Base" control 203. The control 130 shown in Figure 2B serves to control the number of range marks observable in both the azimuth and elevation displays, and hence may be termed a "Map Length" control, i. e., it influences the positions of the lines MN and GH in the azimuth and elevation displays, respectively.

An important feature of the present sweep limiting arrangement is its flexibility in shaping or tailoring the displays when the cathode ray beam travels at a uniform speed to define linear sweeps, or when such beam travels at a non-uniform speed to define so-called "logarithmic sweeps" which are developed in accordance with the apparatus described and claimed for that purpose in the copending application of Homer G. Tasker and Martin H. Shuler, Serial No. 175,168, filed July 21, 1950, now Patent Number 2,737,654 issued March 6, 1956, and assigned to the same assignee as the present invention. This flexible feature is described in relationship to Figure 8.

While, as indicated in Figure 8, the line LM shown in the linear display in Figure 1 assumes the position designated by the line L'M' in Figure 8, when the cathode beam sweeps are logarithmic in nature, the non-linearity in the line L'M' may be made linear to assume the position indicated by the straight horizontal line L''M' in Figure 8, using for that purpose the so-called "Azimuth Linearity" control 192 in Figure 2B. The purpose of this "Azimuth Linearity" control 192 is to purposely introduce distortion in the sawtooth waveforms in the logarithmic displays in such a manner that the high frequencies are accentuated or emphasized in relationship to low frequency components.

Using logarithmic sweeps, the sweep limiting line KJ, while linear in the linear display shown in Figure 1, becomes slightly curved when the cathode beam sweep amplifier is adjusted to produce logarithmic sweeps, but this does not impose any serious consequences since the line KJ is relatively short, and even so, line KJ is straightened somewhat by adjustment of the control 192 in obtaining the above mentioned linearity of line L''M'.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, energy transmitting means periodically triggered at a relatively high rate to produce an antenna beam, means for scanning said antenna beam in space, means deriving an angle voltage, the instantaneous magnitude of which is representative of the position of the antenna beam, a cathode ray tube having cathode beam deflecting means, means operated synchronously with said transmitting means for energizing said beam deflecting means to produce cathode beam sweeps, said cathode ray tube having an intensity controlling electrode, sweep limiting means comprising: means producing a series of sawtooth waves in timed relationship with operation of said transmitting means, means modulating the intensity of each of said sawtooth waves in accordance with the instantaneous magnitude of said angle voltage, means sensitive to the magnitude of said angle voltage for picking off the peaks of said series of sawtooth waves to produce a corresponding series of voltage variations each starting at different times with respect to energization of said beam deflecting means, and means controlled by the last mentioned voltage variations for developing gating voltages and for applying the same to said intensity controlling electrode.

2. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having cathode beam deflecting means, two position beam centering means alternately effective to move the cathode beam to different adjusted center positions, means operated synchronously with said transmitting means for energizing said beam deflecting means to produce cathode beam sweeps, means operated synchronously with said coupling means to change from one of said centering means to the other centering means and to alternatively and synchronously apply said azimuth and elevation angle voltage to one of said beam deflecting means, to thereby obtain alternate azimuth and elevation displays of the space scanned by said azimuth and elevation antenna beams, said cathode ray tube having an intensity controlling electrode, sweep limiting means comprising: means for generating a series of sawtooth waves in timed relationship with operation of said transmitting means, said last mentioned sawtooth generating means including means for alternately applying said azimuth and elevation angle voltages thereto and for producing sawtooth waves therein varying in amplitude in accordance with the intensity of either the azimuth or elevation angle voltage, as the case may be, means picking off the peaks of said sawtooth waves of variable amplitude to produce a corresponding series of time displaced waves, and means controlled by said time displaced waves for developing gating voltages and applying the same to said intensity controlling electrode.

3. In a system of the character described, a cathode ray tube, means producing an antenna beam which consists of a series of pulses occurring at a relatively high rate, means for scanning said antenna beam at a relatively low rate, means deriving a beam angle voltage the magnitude of which is representative of the angular position of the antenna beam, means periodically producing cathode beam sweeps in timed relationship with operation of said antenna beam producing means, means intensity modulating said sweeps in accordance with the instantaneous magnitude of said angle voltage, means including said beam angle voltage deriving means and sensitive to the instantaneous magnitude of said angle voltage for producing a series of time spaced peaked voltages which occur at different times with respect to operation of said sweep producing means, and means controlled by said peaked voltages for deriving corresponding time spaced blanking voltages and for applying the same to an intensity control electrode of said tube.

4. In a system of the character described, a cathode ray tube, means producing an antenna beam which consists of a series of pulses occurring at a relatively high rate, means for scanning said antenna beam at a relatively low rate, means deriving a beam angle voltage the magnitude of which is representative of the angular position of the antenna beam, means periodically producing a cathode beam sweep in timed relationship with operation of said antenna beam producing means, means including said beam angle voltage deriving means for producing a series of sawtooth waves in timed relationship with operation of said antenna beam producing means with each of said sawtooth waves varying in amplitude in accordance with the angular position of said antenna beam and with said series occurring at said relatively low rate, means picking off the peaks of said sawtooth waves in each series to produce a corresponding series of waves displaced in time with respect to the time of operation of said sweep producing means, means peaking said series of waves to produce corresponding peaked waves, and sweep blanking means controlled by said peaked waves.

5. In an arrangement of the character described, a cathode ray tube, cathode beam sweep producing means, cathode beam intensifying means, antenna means, synchronizing means producing trigger voltage pulses, means for deriving pulsed energy in accordance with said trigger voltage pulses, means transferring said pulsed energy to said antenna means to produce a pulsed energy beam, means scanning said pulsed energy beam through space, means deriving an angle voltage representative of the angular position of the pulsed energy beam, means energizing said cathode beam sweep producing means periodically in synchronism with development of said trigger voltage pulses, means modulating said sweep producing means with said angle voltage to produce a series of displaced cathode beam sweeps, condenser means, means periodically charging said condenser with said angle voltage in synchronism with the appearance of said trigger voltage pulses, to develop a series of variable intensity voltage waves varying in time, pickoff means for deriving voltage variations displaced in time with respect to operation of said sweep producing means and in accordance with the intensity of said voltage waves, peaking means coupled to said pickoff means for developing corresponding peaked waves, and sweep limiting means coupled to said peaking means, said sweep limiting means including said intensity control means.

6. In a sweep limiting system of the character described, a cathode ray tube, antenna means, means periodically operative for transferring energy to said antenna means to produce an antenna beam, means producing cathode beam sweeps in said tube in timed relationship with operation of said energy transferring means, means for scanning said antenna beam through space at a relatively low rate, means producing an angle voltage representative of the position of said antenna beam in space, means generating a series of variable intensity sawtooth waves in timed relationship with operation of said energy transferring means, the intensity of each of said sawtooth waves being representative of the instantaneous angle voltage, pickoff means for picking off the peaks of said series of sawtooth waves to produce a corresponding series of peaked waves spaced in time with respect to operation of said cathode beam sweep producing means, means deriving a series of time spaced blanking voltages from corresponding time spaced peaked waves.

7. In a system of the character described, a cathode ray tube including beam sweep producing means, an independent sweep generator including a condenser, a source of beam angle voltage varying in amplitude at a relatively low rate and coupled to said condenser for charging the same, a source of triggering pulses coupled to said sweep generator for successively altering the charged condition of said condenser at a relatively high rate, a pickoff tube coupled to said condenser for deriving therefrom a plurality of voltage waves, each starting at different times with respect to appearance of said triggering pulses, means deriving a corresponding cathode beam sweep blanking voltage in timed relationship with each of said voltage waves, and means applying said blanking voltage to an intensity control electrode of said tube.

8. In a system of the character described, a cathode ray tube with associated beam sweep producing means, a sweep generator including a condenser, a source of beam angle voltage, the amplitude of which varies in accordance with the position of an antenna beam, means coupling said source of beam angle voltage to said condenser for charging the same at a relatively low rate, a source of triggering pulses coupled to said condenser for periodically discharging the same at a relatively high rate, said sweep generator including means for developing a series of sawtooth waves with each sawtooth wave initiated at the same time in relationship to the appearance of said triggering pulses, but, said sawtooth waves having amplitudes varying in accordance with the instantaneous magnitude of beam angle voltage, sawtooth voltage wave pickoff means coupled to said condenser and effective to produce from said voltage waves a corresponding series of clipped voltage waves each starting at different times with respect to the appearance of said triggering pulses, means deriving cathode beam sweep blanking voltages which appear respectively in timed relationship with said clipped voltage waves, and means applying said blanking voltages to an intensity control electrode of said tube.

9. The arrangement set forth in claim 8 in which adjustable means are provided for adjusting the magnitude of beam angle voltage applied to said condenser.

10. The arrangement set forth in claim 8 in which adjustable means are incorporated for adjusting the level of operation of said sawtooth voltage wave pickoff means.

11. The arrangement set forth in claim 8 in which adjustable means are provided for adjusting the magnitude of the beam angle voltage applied to said condenser, and adjustable means are incorporated for adjusting the level of operation of said sawtooth voltage wave pickoff means.

12. The arrangement set forth in claim 8 in which means are coupled to said source of beam angle voltage for rendering said blanking voltage deriving means inoperative in accordance with the predetermined magnitude of said beam angle voltage.

13. The arrangement set forth in claim 8 including means modulating said sweep producing means with beam angle voltage to produce lateral movement of successive sweeps.

14. The arrangement set forth in claim 8 including means modulating said sweep producing means with beam angle voltage to produce lateral movement of successive sweeps, with the beam angle voltage applied to said cathode beam sweep producing means and to said condenser varying in the same direction.

15. The arrangement set forth in claim 8 including means modulating said sweep producing means with beam angle voltage to produce lateral movement of successive sweeps, with the beam angle voltage applied to said cathode beam sweep producing means and to said condenser varying in opposite directions.

16. The arrangement set forth in claim 8 including means modulating said sweep producing means with beam angle voltage to produce lateral movement of successive sweeps, with the beam angle voltage applied to said cathode beam sweep producing means and to said condenser varying in opposite directions, and in which a beam angle voltage varying in the opposite direction as that beam angle voltage applied to the condenser is coupled to said sweep blanking means to render the same inoperative upon attainment of a predetermined angle voltage.

17. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having cathode beam deflecting means, two position beam centering means alternately effective to move the cathode beam to different adjusted center positions, means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to one of said beam deflecting means, to thereby obtain alternate azimuth and elevation displays of the space scanned respectively by said azimuth and elevation antenna beams, said cathode ray tube having an intensity control electrode, means for generating a series of time spaced cathode beam blanking pulses, said series being generated in timed relationship with operation of said transmitting means, said last mentioned generating means including means for alternately applying said azimuth and elevation angle voltages thereto and for producing said blanking pulses, each of which are spaced at different times with respect to time of operation of said transmitting means in accordance either with the amplitude of the azimuth or elevation angle voltage, as the case may be, and means coupling said intensifying pulse generating means to said intensity controlling electrode.

18. In an arrangement of the character described, for producing sweep limiting along a predetermined line in a cathode ray tube presentation, energy transmitting means periodically triggered at a relatively high rate to produce an antenna beam, means for scanning said antenna beam in space, means deriving an angle voltage, the instantaneous magnitude of which varies substantially linearly with the position of the antenna beam, a cathode ray tube having cathode beam deflecting means, means operated synchronously with said transmitting means for energizing said beam deflecting means to produce cathode beam sweeps, means modulating said sweeps in accordance with the magnitude of said angle voltage, said cathode ray tube having an intensity controlling electrode, means including said intensity controlling electrode and sensitive to the magnitude of said angle voltage for changing the visible character of a portion of each one of said cathode beam sweeps, along said predetermined line, said portion of each of said sweeps being spaced variable distances from the origin of the sweeps in accordance with the following expression:

$$T = \frac{1}{b - cV} + a$$

where $a$, $b$, and $c$ are constants, $V$ is equal to the magnitude of said angle voltage, and $T$ represents the time it requires the corresponding sweep to travel from the origin of the sweeps to said portion of the sweep, the visible character of which is changed.

References Cited in the file of this patent

UNITED STATES PATENTS

| 2,414,486 | Rieke | Jan. 21, 1947 |
| 2,459,481 | Wolff | Jan. 18, 1949 |
| 2,495,753 | Mozley | Jan. 31, 1950 |

FOREIGN PATENTS

| 588,851 | Great Britain | June 4, 1947 |